(12) United States Patent
Matula et al.

(10) Patent No.: US 11,862,169 B2
(45) Date of Patent: Jan. 2, 2024

(54) MULTILINGUAL TRANSCRIPTION AT CUSTOMER ENDPOINT FOR OPTIMIZING INTERACTION RESULTS IN A CONTACT CENTER

(71) Applicant: Avaya Management L.P., Santa Clara, CA (US)

(72) Inventors: Valentine C. Matula, Granville, OH (US); Pushkar Yashavant Deole, Pune (IN); Sandesh Chopdekar, Pune (IN); Navin Daga, Silapathar (IN)

(73) Assignee: Avaya Management L.P., Santa Clara, CA (US)

( * ) Notice: Subject to any disclaimer, the term of this patent is extended or adjusted under 35 U.S.C. 154(b) by 327 days.

(21) Appl. No.: 17/017,941

(22) Filed: Sep. 11, 2020

(65) Prior Publication Data
US 2022/0084523 A1 Mar. 17, 2022

(51) Int. Cl.
*G10L 15/26* (2006.01)
*G10L 15/22* (2006.01)
*G10L 15/30* (2013.01)

(52) U.S. Cl.
CPC .............. *G10L 15/26* (2013.01); *G10L 15/22* (2013.01); *G10L 15/30* (2013.01); *G10L 2015/223* (2013.01)

(58) Field of Classification Search
CPC .......... G10L 15/22; G10L 15/26; G10L 15/30
See application file for complete search history.

(56) References Cited

U.S. PATENT DOCUMENTS

| | | | |
|---|---|---|---|
| 6,885,735 B2 | 4/2005 | Odinak et al. | |
| 8,204,746 B2 | 6/2012 | Odinak | |
| 2006/0253272 A1* | 11/2006 | Gao | G10L 13/00 704/E13.008 |
| 2014/0314220 A1* | 10/2014 | Charugundla | H04M 1/642 379/88.14 |

* cited by examiner

*Primary Examiner* — Ibrahim Siddo
(74) *Attorney, Agent, or Firm* — Stevens & Showalter LLP

(57) ABSTRACT

Providing speech-to-text (STT) transcription by a user endpoint device includes initiating an audio communication between an enterprise server and the user endpoint device, the audio communication comprising a voice interaction between a user associated with the user endpoint device and an agent associated with an agent device to which the enterprise server routes the audio communication; performing a first STT of at least a portion of the voice interaction to produce a first transcribed speech in a first language; concurrent with performing the first STT, performing, by the user endpoint device, a second STT of the at least the portion of the voice interaction to produce a second transcribed speech in a second language different than the first language, and transmitting the at least the portion of the voice interaction and at least the first transcribed speech from the user endpoint device to the enterprise server.

18 Claims, 9 Drawing Sheets

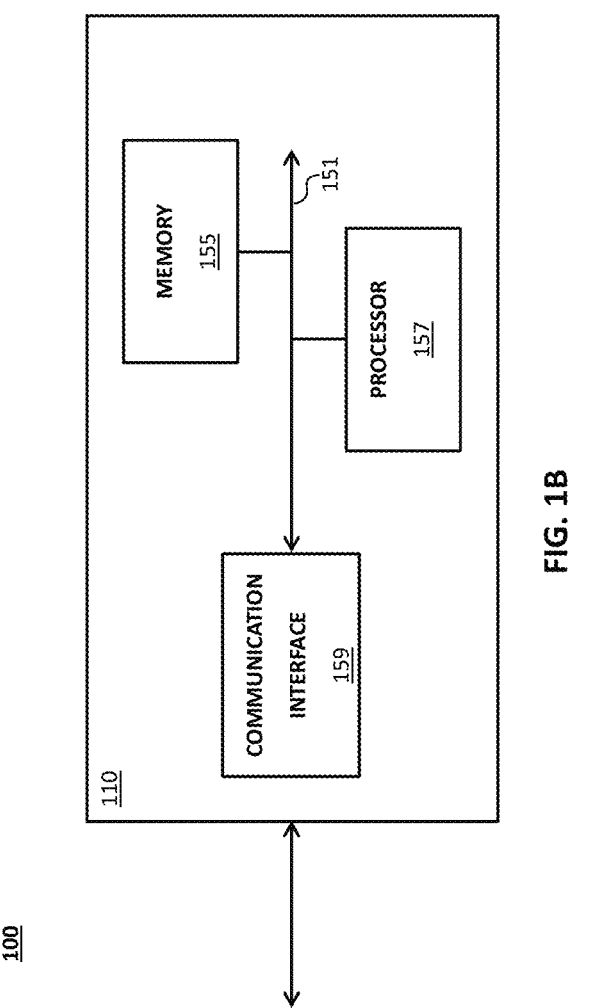

MULTILINGUAL TRANSCRIPTION AT CUSTOMER ENDPOINT FOR OPTIMIZING INTERACTION RESULTS IN A CONTACT CENTER

BACKGROUND

Field

Embodiments of the present disclosure generally relate to a system and method for transcribing voice interactions between a user and an agent of a call center, wherein the transcription takes place on a user device associated with the voice interaction.

Description of Related Art

Contact centers are employed by many enterprises to service inbound and outbound contacts from customers. Call centers provide a convenient means for users to troubleshoot problems with enterprises including manufacturers and service vendors. A primary objective of contact center management is to ultimately maximize contact center performance and profitability. While text-based interactions between users and enterprises are becoming increasingly available through social channels such as Facebook, Twitter, WhatsApp, LINE, etc., voice remains the dominant communication media and thus continues to play an important role in today's contact centers.

In order to improve the productivity and performance of call centers, it is beneficial to optimize interaction results through the use of technology that both (1) facilitates and improves the quality of the voice interaction and (2) provides the call center with data that can be utilized to improve future call center practices. Speech-to-text (STT) transcription has become a widespread technique for accomplishing these ends. Transcribed speech may be provided to the participants of the voice interaction in real-time to compensate for barriers to efficient communication which arise from differences in native languages and accents of the participants. Additionally, the transcribed speech may also be provided to the enterprise for performing text-based backend analytics and processing.

SUMMARY

In accordance with a first aspect, a processor-based method for providing speech-to-text (STT) transcription is provided comprising: initiating, by a user endpoint device, an audio communication between an enterprise server and the user endpoint device, the audio communication comprising a voice interaction between a user associated with the user endpoint device and an agent associated with an agent device to which the enterprise server routes the audio communication; performing, by the user endpoint device during the audio communication, a first STT of at least a portion of the voice interaction to produce a first transcribed speech in a first language; concurrent with performing the first STT, performing, by the user endpoint device, a second STT of the at least the portion of the voice interaction to produce a second transcribed speech in a second language different than the first language, and transmitting, by the user endpoint device during the audio communication, the at least the portion of the voice interaction and at least the first transcribed speech from the user endpoint device to the enterprise server.

The method may further comprise transmitting, by the user endpoint device during the audio communication, the second transcribed speech from the user endpoint device to the enterprise server.

The at least the portion of the voice interaction may comprise first speech provided by the user and second speech provided by the agent. The second transcribed speech may comprise a transcription of the second speech provided by the agent. The method may further comprise displaying, by the user endpoint device, the transcription of the second speech provided by the agent on a display apparatus of the user endpoint device during the audio communication.

The at least the portion of the voice interaction and the first transcribed speech may be transmitted substantially concurrently with each other. The first transcribed speech may be transmitted via a digital channel and the at least the portion of the voice interaction may be transmitted via a voice channel.

The method may further comprise: determining, by the user endpoint device, whether or not the user endpoint device has the computational capability to perform STT of the at least the portion of the voice interaction; and transmitting, by the user endpoint device to the enterprise server, the determination as to whether or not the user endpoint device has the computational capability to perform STT of the at least the portion of the voice interaction.

The first language may be a default system language defined by the enterprise server.

The first language may be a related language of the agent, and the second language may be a related language of a user. The method may further comprise: sending, by the user endpoint device, an inquiry to the enterprise server requesting an identification of a more-related language of the agent; and in response to sending the inquiry, receiving, by the user endpoint device from the enterprise server, the identification of the more-related language of the agent.

Initiating the audio communication, performing the first STT, and transmitting the at least the portion of the voice interaction and the first transcribed speech may be performed by one of an audio-capable application executing on the user endpoint device, a plug-in of a web browser executing on the user endpoint device, or a customized client application executing on the user endpoint device.

In accordance with a second aspect, a user endpoint device for providing speech-to-text (STT) transcription is provided comprising: a memory device storing executable instructions; and a processor in communication with the memory device, wherein the processor when executing the executable instructions: initiates an audio communication between an enterprise server and the user endpoint device, the audio communication comprising a voice interaction between a user associated with the user endpoint device and an agent associated with an agent device to which the enterprise server routes the audio communication; performs during the audio communication, a first STT of at least a portion of the voice interaction to produce a first transcribed speech in a first language; concurrent with performing the first STT, performs a second STT of the at least the portion of the voice interaction to produce a second transcribed speech in a second language different than the first language, and transmits, during the audio communication, the at least the portion of the voice interaction and at least the first transcribed speech from the user endpoint device to the enterprise server.

The processor when executing the executable instructions may transmit, during the audio communication, the second transcribed speech from the user endpoint device to the enterprise server.

The at least the portion of the voice interaction may comprise first speech provided by the user and second speech provided by the agent. The second transcribed speech may comprise a transcription of the second speech provided by the agent. The processor when executing the executable instructions may display the transcription of the second speech provided by the agent on a display apparatus of the user endpoint device during the audio communication.

The at least the portion of the voice interaction and the first transcribed speech may be transmitted substantially concurrently with each other. The first transcribed speech may be transmitted via a digital channel and the at least the portion of the voice interaction may be transmitted via a voice channel.

The processor when executing the executable instructions may: determine whether or not the user endpoint device has the computational capability to perform STT of the at least the portion of the voice interaction; and transmit to the enterprise server, the determination as to whether or not the user endpoint device has the computational capability to perform STT of the at least the portion of the voice interaction.

The first language may be a default system language defined by the enterprise server.

The first language may be a related language of the agent, and the second language may be a related language of a user.

The processor when executing the executable instructions: may send an inquiry to the enterprise server requesting an identification of a more-related language of the agent; and may, in response to sending the inquiry, receive from the enterprise server, the identification of the more-related language of the agent.

Initiating the audio communication, performing the first STT, and transmitting the at least the portion of the voice interaction and the first transcribed speech may be performed by one of an audio-capable application executing on the user endpoint device, a plug-in of a web browser executing on the user endpoint device, or a customized client application executing on the user endpoint device.

The preceding is a simplified summary to provide an understanding of some aspects of embodiments of the present disclosure. This summary is neither an extensive nor exhaustive overview of the present disclosure and its various embodiments. The summary presents selected concepts of the embodiments of the present disclosure in a simplified form as an introduction to the more detailed description presented below. As will be appreciated, other embodiments of the present disclosure are possible utilizing, alone or in combination, one or more of the features set forth above or described in detail below.

BRIEF DESCRIPTION OF THE DRAWINGS

FIG. 1B illustrates at a relatively high-level hardware abstraction a block diagram of a server such as the server 110, in accordance with an embodiment of the present disclosure.

DETAILED DESCRIPTION

Figure 1A:
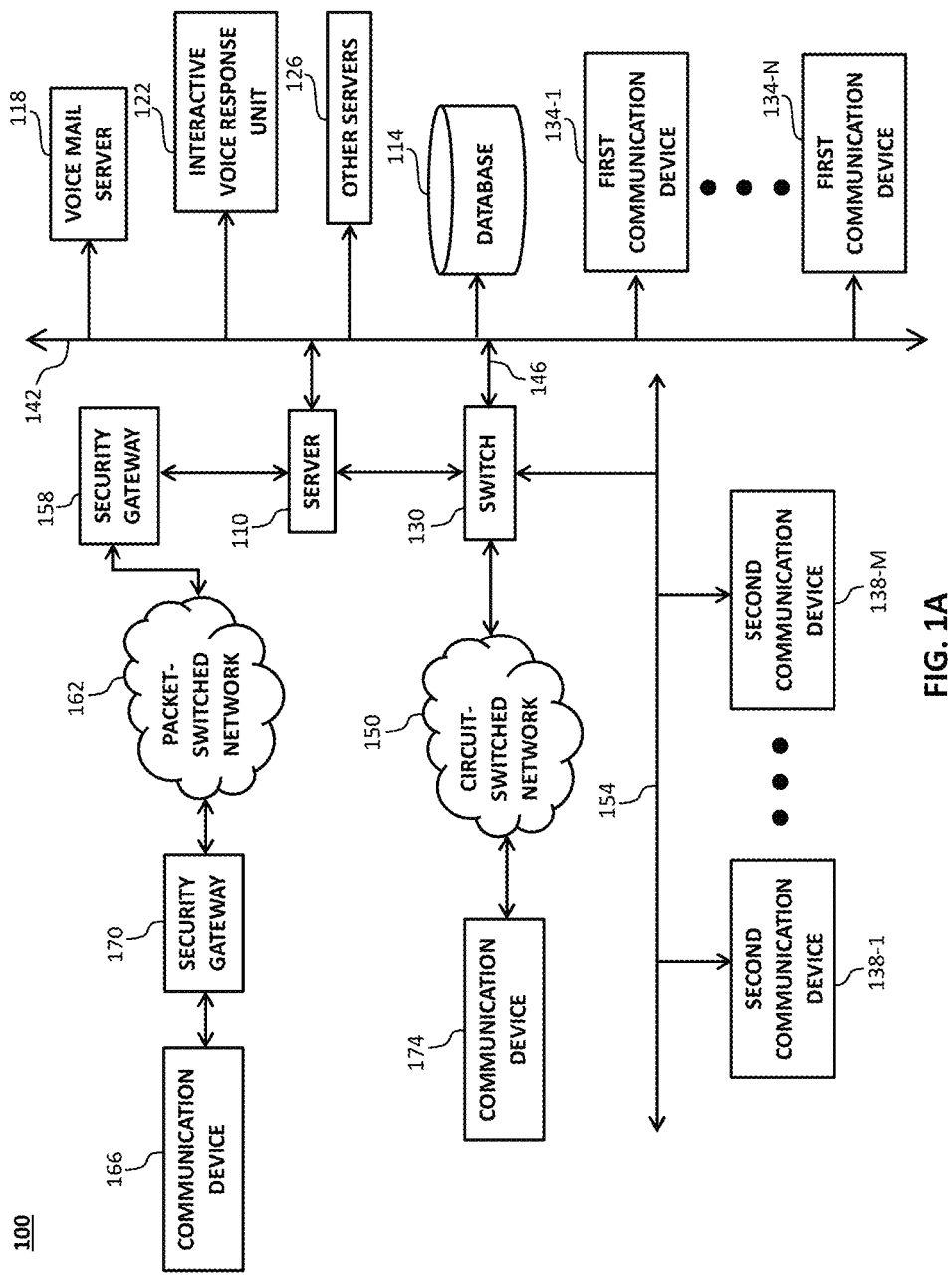
FIG. 1A shows an illustrative embodiment of the present disclosure.

As mentioned above, transcribed speech may be provided to the participants of the voice interaction in real-time to compensate for barriers to efficient communication which arise from differences in native languages and accents of the participants. Additionally, the transcribed speech may also be provided to the enterprise for performing text-based backend analytics and processing. Presently, STT transcription takes place at the enterprise end which requires significant computational resources and is not specifically tailored to the particular speech characteristics of different users. Therefore, there is a need for a system and method for performing STT transcriptions that addresses the challenges facing call centers.

Today's customers often prefer to avail the services of contact centers through powerful devices such as smartphones and smart tablets as opposed to using landline equipment. The power of these devices evolves through their extensible and customizable nature providing the capability to utilize diverse applications (apps) which can be installed and executed locally on the device. The complexity of these apps varies from simple, such as those offering music or game services, to highly-complex, such as personal assistants or STT transcribers. Advancements in technologies related to the power of smart devices and the speed and accuracy of STT engines have made it possible to perform STT transcriptions at customer endpoints in real-time with sufficient accuracy. There is a need for a method and system which utilizes the increasing power of user endpoint devices such that STT transcriptions can take place locally on user endpoint devices rather than a server associated with an enterprise or contact center.

Embodiments of the present disclosure provide a computing system and method for utilizing user endpoint devices for performing STT transcriptions of calls between a user/customer and an agent of an enterprise. The invention provides a way to take advantage of the power of millions of smart devices to improve call center profitability as well as the quality of the calls. The invention allows the enterprise to reduce costs as it removes the need for costly third-party STT engines. At the same time, performing STT at the user endpoint device saves the enterprise significant computational resources, which are especially valuable in today's cloud computing era.

An embodiment of the present disclosure enhances the way in which voice interaction between a user and an enterprise takes place by augmenting the voice interaction with the transcribed speech in real-time. The transcribed text may be displayed on one or both ends of the audio communication and may improve the quality of the call by providing a transcription of the call in a language preferable to the agent and/or user.

An embodiment of the invention comprises a method wherein a transcription of the call is provided in multiple languages. These languages may include a related language of either party, a related language of the enterprise and/or operating company, and/or a default system language to be used for backend analytics and processing. A "related language" could be a native language or a preferred language of a participant of the call.

In an embodiment of the present disclosure, the enterprise is a call center and a transcript of the user's voice is provided to a display on a device an agent of the call center is using to facilitate the call, e.g., to be displayed within a desktop application on an agent's computer station. The language may be provided to the agent in a preferred language such as the agent's mother tongue or native language, as well as any other language in which the agent might feel comfortable with for the purposes of the call.

From a quality perspective, the present disclosure permits a more productive STT transcription since the user endpoint device may be better tuned, configured, and/or customized for transcription of the user's particular language and accent. Advanced STT engines are capable of improving their transcription capability by learning a particular user's voice characteristics. Additionally, a user may manually adjust his or her particular accent settings to improve the effectiveness of the STT transcription. For example, a person of Asian descent may select Asian-English as his or her accent, and such a selection might permit the STT engine to tailor its algorithm accordingly to improve transcription quality and efficiency. Embodiments of the present disclosure aim to utilize this aspect of STT engines and powerful user endpoint devices to improve the performance in addition to the profitability of calls between a user and an enterprise.

Thus, the present disclosure provides a system and method for utilizing a processor associated with a user endpoint device to perform at least one STT transcription of at least a portion of a voice interaction produced during an audio communication (call) between a user and an agent associated with an enterprise. This call may be initiated by the user associated with the user endpoint device using, for example, a smart app or web application. The user endpoint device may be a smartphone, another smart device such as a tablet, or any other device capable of initiating calls using Voice Over Internet Protocol (VoIP), Web Real-Time Communication (WebRTC), or other technological means which permit the audio of a call to be shared with an STT engine for transcription, and also allows for multi-channel communication. Furthermore, the call may comprise an audio communication alone or an audio communication in conjunction with audiovisual communication.

The processor associated with the user endpoint device may utilize any available STT engine on the market. Speech recognition (also known as voice recognition) is the process of converting spoken words into computer text. Also known as Speech-to-text (STT) as used herein, STT can be accomplished using a variety of available software applications and "engines" to transcribe audio conversations in one spoken language into textual renditions in a variety of different languages. Additionally, STT not only handles different languages, but also dialects within individual languages. The embodiments of the present disclosure contemplate such functionality of the STT engine of disclosed system and method. Thus, as described herein, STT transcription may be performed to a preferred or related language comprising different languages or even dialects within different languages. Furthermore, as is known in the field of voice recognition, an STT engine can include machine learning components that allow that engine to be trained for a particular speaker such that the accuracy of the STT transcription can be improved.

In one embodiment, for example, a method comprises an audio communication between a user endpoint device and an agent associated with an enterprise server, to which the enterprise server routes the call. The audio communication may comprise a voice interaction between the user and the agent. The call may be initiated through the use of an audio-capable application for initiating calls between multiple parties. For example, the call may be initiated using Skype, Google Duo, a customized application of the enterprise, or even through a web page associated with a web application, e.g., using a web browser plug-in. In the context of the present disclosure, it is to be understood that a step taken by the user endpoint device may be a step performed by the user endpoint device in conjunction with the audio-capable application used to initiate and facilitate the call.

If no agent is available to take the call, the call can be placed in a wait queue in the enterprise and, for example, on-hold music or announcements can be played back to the user. When an agent of the enterprise becomes available, the call is taken out of the wait queue and assigned to the available agent.

As mentioned, the call may be made through the use of a web browser plug-in which is used to initiate audio communications between multiple parties. Alternatively, WebRTC provides web browsers and mobile applications the ability to communicate in audio and video in real-time without the need for a plug-in. Alternatively, the call may be initiated through the use of a customized application associated with the enterprise, e.g., one created by the enterprise or specifically for the enterprise. The customized application may be downloaded and installed on the user's endpoint device.

Additionally, the call may also be initiated using a traditional phone application. In this instance, the operating system, e.g., Google Android, iOS, etc., may share the audio data with a helper application for performing the STT transcription. To facilitate this functionality, a separate channel may be initialized to transmit the transcribed text concurrently with the voice data being transmitted on the voice channel set up by the traditional phone application.

The system and method may further comprise a step wherein a determination is made regarding what language the STT should transcribe the at least portion of the voice interaction. In order to do this, the user endpoint device may, upon initiating the call, send an inquiry to the enterprise server to determine at least one related language in which to transcribe the voice interaction. Alternatively, the determination of the related language may take place after the call is assigned to an agent associated with the enterprise. The possible related languages include a native language of the agent and/or a preferred language of the agent, call center, and/or operating company. Additionally, this inquiry may also check to determine what language to transcribe the voice interaction for the purposes of backend analytics by the enterprise and/or operating company. In a different example, the end user device may, upon initiating the call, provide to the enterprise server a list of languages for which it has the capability of transcribing audio or speech data.

Embodiments of the present disclosure will be illustrated below in conjunction with an exemplary communication system, e.g., the Avaya Aura® system. Although well suited for use with, e.g., a system having an Automatic Call Distribution (ACD) or other similar contact processing switch, embodiments of the present disclosure are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present disclosure are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure can be separately claimed.

A module that performs a function also may be referred to as being configured to perform the function, e.g., a data module that receives data also may be described as being configured to receive data. Configuration to perform a function may include, for example: providing and executing computer code that performs the function; providing provisionable configuration parameters that control, limit, or enable capabilities of the module (e.g., setting a flag, setting permissions, setting threshold levels used at decision points, etc.); providing a physical connection, such as a jumper to select an option, or to enable/disable an option; attaching a physical communication link; enabling a wireless communication link; energizing a circuit that performs the function (e.g., providing power to a transceiver circuit in order to receive data); and so forth.

The term "switch" or "server" as used herein should be understood to include a Private Branch Exchange (PBX), an ACD, an enterprise switch, an enterprise server, or other type of telecommunications system switch or server, as well as other types of processor-based communication control devices such as media servers, computers, adjuncts, etc.

FIG. 1A shows an illustrative embodiment of the present disclosure. A contact center 100 comprises a server 110, a set of data stores or databases 114 containing contact or customer related information, resource or agent related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). In another embodiment of the present disclosure, the customer and agent related information may be replicated over multiple repositories.

The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present disclosure, the security gateway 158 (as shown in FIG. 1A) may be a G700 Media Gateway™ from Avaya Inc., or may be implemented as hardware such as via an adjunct processor (as shown) or as a chip in the server 110.

The switch 130 and/or server 110 may be any architecture for directing contacts to one or more communication devices. In some embodiments of the present disclosure, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the 4600 Series IP Phones™ from Avaya, Inc., IP softphones such as an IP Softphone™ from Avaya Inc., Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext-1-M, respectively. The second communication devices 138-1-M may include, for example, wired and wireless telephones, PDAs, H.320 videophones and conferencing units, voice messaging and response units, traditional computer telephony adjuncts, and any other communication devices.

It should be noted that the embodiments of the present disclosure do not require any particular type of information transport medium between switch, or server and first and second communication devices, i.e., the embodiments of the present disclosure may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 166 via a security gateway 170, and the circuit-switched network 150 with an external second communication device 174.

In one configuration, the server 110, the packet-switched network 162, and the first communication devices 134-1-N are Session Initiation Protocol (SIP) compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized that the configuration of the switch 130, the server 110, user communication devices, and other elements as shown in FIG. 1A are for purposes of illustration only and should not be construed as limiting embodiments of the present disclosure to any particular arrangement of elements.

Further, the server 110 is notified via the LAN 142 of an incoming service request or work item by the communications component (e.g., switch 130, a fax server, an email server, a web server, and/or other servers) receiving the incoming service request as shown in FIG. 1A. The incoming service request is held by the receiving telecommunications component until the server 110 forwards instructions to the component to forward or route the contact to a specific contact center resource, such as the IVR unit 122, the voice mail server 118, and/or first or second telecommunication device 134-1-N, 138-1-M associated with a selected agent.

FIG. 1B illustrates at a relatively high-level hardware abstraction a block diagram of a server such as the server 110, in accordance with an embodiment of the present disclosure. The server 110 may include an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out various functions of the server 110.

Although embodiments are discussed with reference to client-server architecture, it is to be understood that the principles of embodiments of the present disclosure apply to other network architectures. For example, embodiments of the present disclosure apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, embodiments of the present disclosure do not require the presence of packet- or circuit-switched networks.

Figure 2:
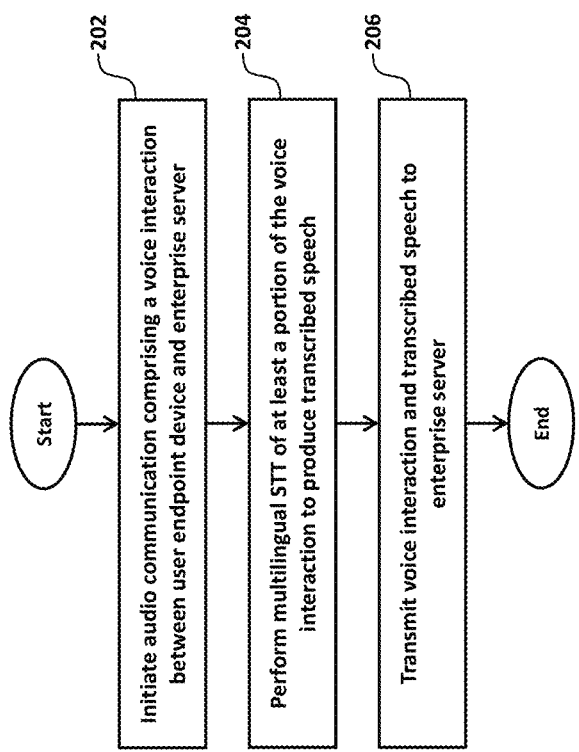
FIG. 2 depicts a high-level flowchart of an example method in accordance with the principles of the present disclosure.

FIG. 2 depicts a high-level flowchart of the method disclosed herein.

At step 202, a user may initiate an audio communication, using a user endpoint device, with an enterprise, particularly with an agent associated with an agent device to which an enterprise server routes the audio communication.

At step 204, during the audio communication, the user endpoint device may perform multilingual STT of at least a portion of the voice interaction to produce transcribed speech.

At step 206, during the audio communication, the user endpoint device may transmit the at least the portion of the voice interaction and transcribed speech to the enterprise server.

The frequency of transmission may depend on a number of factors. However, embodiments in accordance with the present disclosure contemplate the sending of the transcribed speech in a manner that it appears to mimic the audio conversation, or audio communication, in real-time. One benefit of the transcribed speech is to assist the user associated with the user endpoint device and an agent associated with an agent device to which the enterprise server routes the audio communication. As such, performing the STT and transmitting the STT in real-time or near real-time can enhance the understanding of the audio conversation by one or both of the parties, and thus achieve a more productive conversation and better outcome of the interaction.

Figure 3A:
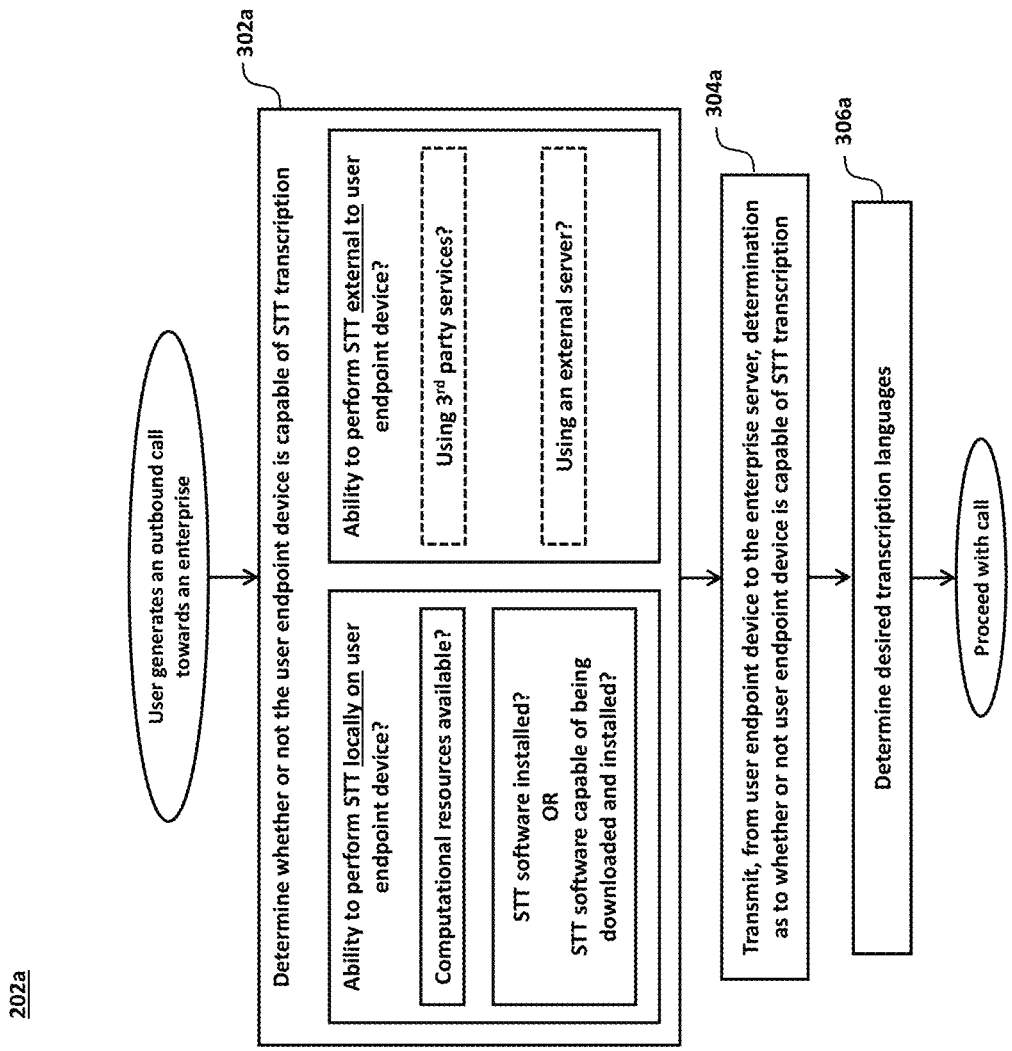
FIGS. 3A and 3B depict flowcharts showing embodiments of example steps which may be performed by the user endpoint device upon initiating the audio communication in accordance with the principles of the present disclosure.
Figure 3B:
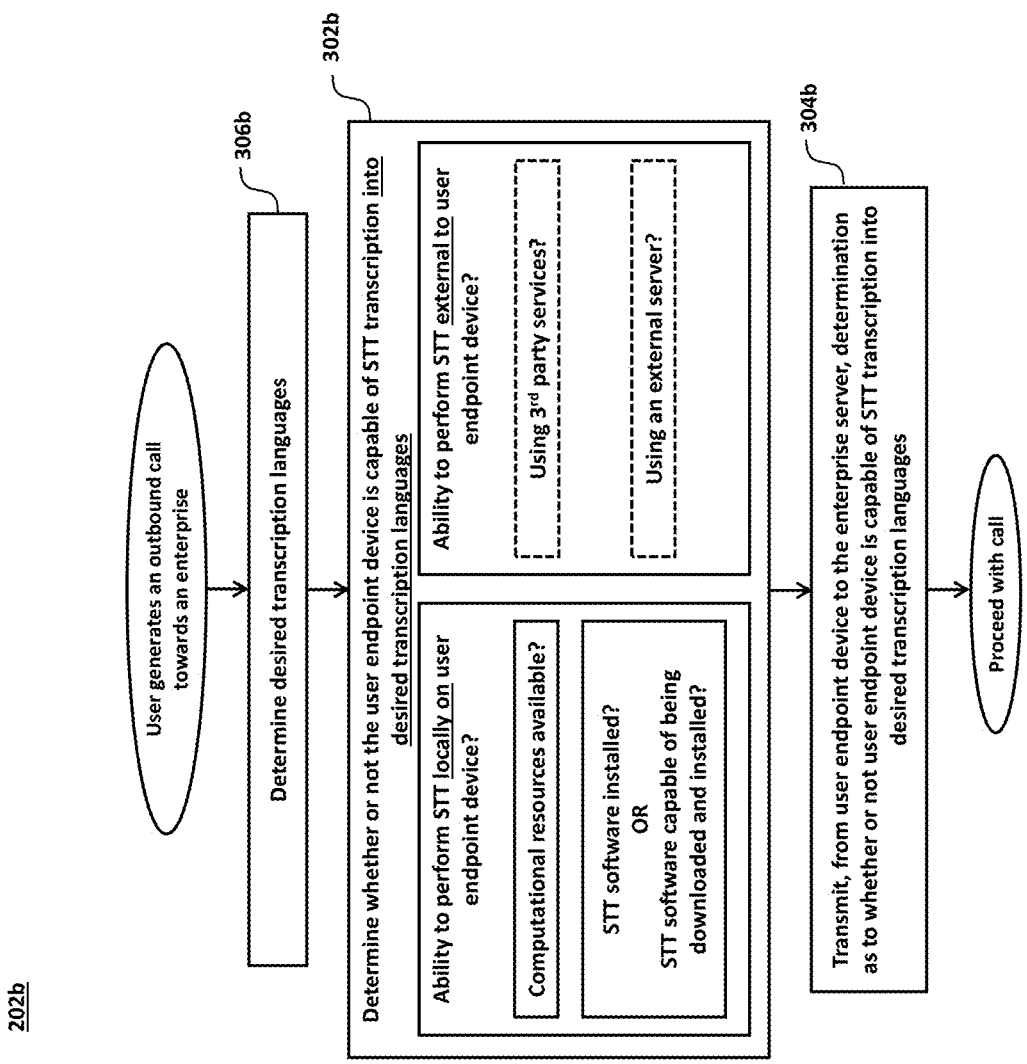

FIGS. 3A and 3B depict flowcharts showing embodiments of the steps which may be performed by the user endpoint device upon initiating the audio communication. While the flowcharts and corresponding discussion are in relation to particular sequences of events, changes, additions, and omissions to this sequence can occur without materially affecting the operation of embodiments of the present disclosure. The illustrated flowcharts 3A and 3B are examples of two methods in accordance with the principles of the present disclosure. While the steps may be shown sequentially and occurring in a particular order, one of ordinary skill will recognize that some of the steps may be performed in a different order and some of the steps may be performed in parallel as well.

FIG. 3A depicts a flowchart 202a showing steps which may be performed by the user endpoint device upon initiating the audio communication. Once the user generates an outbound call towards an enterprise, the following steps may occur:

First, the user endpoint device may determine whether or not it is capable of performing STT transcription at step 302a. Alternatively, while not shown in FIG. 3A, the user endpoint device may also initiate this determination in response to a request from the enterprise server, e.g., the server may send a request for the user endpoint device to respond with whether or not it is capable of performing STT. Two non-inclusive means for the user endpoint device to accomplish the STT transcription include (1) performing the task locally on the user endpoint device and (2) offloading the task to an external computer or server. The latter approach would involve the user endpoint device accessing services provided by the computer or server.

The determination as to whether the user endpoint device is capable of performing the STT transcription locally on the device may comprise identifying the computational resources available on the user endpoint device. For example, this determination may involve checking the available processing power, memory, internet connectivity, and/or other performance metrics of the user endpoint device. Based on this information and the computational resources required for carrying out STT transcription, the user endpoint device may determine whether or not it can perform the task locally. Additionally, the determination of whether or not the user endpoint device is capable of performing STT may involve checking to ensure the device has STT software installed, or the ability to immediately download and install an STT engine for carrying out the transcription task.

Additionally, and/or alternatively, the method of determining whether or not the user endpoint device is capable of performing STT transcription may comprise determining whether it has access to a third-party service such as Google Translate for which it can offload the STT transcription. Another potential means of accomplishing the STT transcription would be to offload the task onto an external server such as a home computer or a network server. Utilizing an external server may require the user endpoint device to first determine whether it is capable of accessing the services of the external server.

Once the determination has been made as to whether or not the user endpoint device is capable of performing STT transcription, the next step 304a may comprise the user endpoint device transmitting this determination to the enterprise server and, subsequently or concurrently, determining the desired languages for which it is to transcribe the voice interaction at step 306a.

Figure 4A:
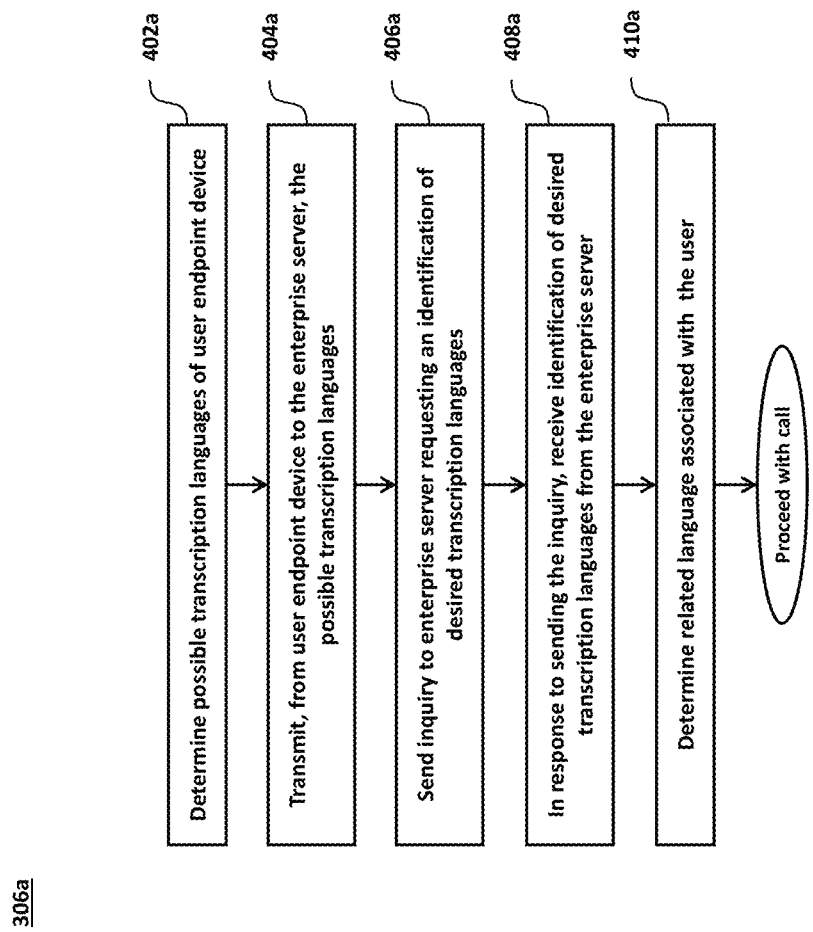
FIGS. 4A and 4B depict flowcharts showing example steps taken by the user endpoint device in determining the desired transcription languages in accordance with the principles of the present disclosure.

FIG. 4A depicts a flowchart 306a showing a set of steps taken by the user endpoint device in determining the desired transcription languages. First, at step 402a, the user endpoint device may determine a set of transcription languages in which it is capable of performing STT. At step 404a, this set of transcription languages may then be transmitted to the enterprise server along with an inquiry, at step 406a, requesting identification of the desired transcription languages. In response, the user endpoint device may receive from the enterprise server a set of desired transcription languages as shown at step 408a. The user endpoint device may experience a temporary hold prior to receiving the set of desired transcription languages as the enterprise server may need to take additional steps prior making this determination. For example, a call center may first need to assign the call to an agent before determining the related languages to identify for STT transcription at the user endpoint device.

Next, at step 410a, the user endpoint device may determine a related language associated with the user of the user endpoint device. This step may involve the user endpoint device referencing an STT language setting configured by the user on an application installed on the user endpoint device. Alternatively, the user endpoint device may query the user to select a language for the STT transcription. Following this step, the user endpoint device is considered to have initialized the audio communication and the method proceeds with step 204 of FIG. 2.

Figure 4B:
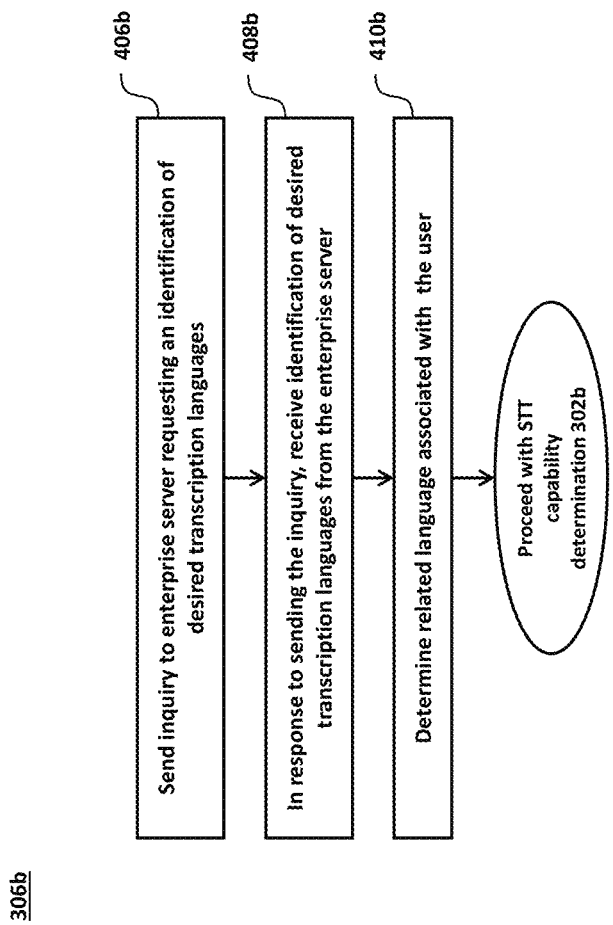

FIG. 3B depicts a flowchart 202b showing another embodiment of the steps which may be performed by the user endpoint device upon initiating the audio communication. The primary difference between this embodiment and the former embodiment is when in the method the determination of the desired languages for STT transcription is performed. In this embodiment, the user endpoint device may determine the desired languages for STT transcription prior to, or concurrently with, determining whether it has the capability to perform STT considering the computational resources available, availability of STT software, and/or access to external means for which it may offload the STT transcription task. Therefore, in this embodiment, rather than send the possible STT languages to the enterprise server, the method may start out with step 306b to determine the desired transcription languages, which comprises the steps shown in the flowchart depicted in FIG. 4B.

First, at step 406b, the user endpoint device may send an inquiry to the enterprise server requesting identification of the desired transcription languages. Next, in response to sending this inquiry, the user endpoint device may receive identification of the desired transcription languages from the enterprise server at step 408b. The user endpoint device may experience a temporary hold prior to receiving the identification of transcription languages as the enterprise server may need to take additional steps prior to making this determination. For example, a call center may first need to assign the call to an agent before determining the related languages to identify for STT transcription at the user endpoint device. The user endpoint device may then, at step 410b, determine a related language associated with the user to complete the set of desired transcription languages before going on to the STT capability determination step 302b in FIG. 3B. As described above for the embodiment shown in FIG. 4A, this step may involve the user endpoint device referencing an STT language setting configured by the user, or querying the user to select a language for the STT transcription.

The user endpoint device may then determine whether or not it is capable of performing STT transcription, and moreover, whether it is capable of performing STT to the desired transcription languages. As discussed above, this will involve the similar steps as outlined in the former embodiment, but with the additional step of checking to see whether or not the user endpoint device is capable of STT transcription to the desired languages. Once this determination has been made, the user endpoint device may transmit this determination to the enterprise server, as shown by step 304*b* in FIG. 3B. Following this step, the user endpoint device is considered to have initialized the audio communication and the method proceeds with step 204 of FIG. 2.

In another embodiment, if STT transcription is to take place on the user endpoint device, through negotiation with the enterprise server, the customized app queries if the current language used for transcription is also the preferred language of the agent, and if not, the user endpoint device will query the preferred language of the agent. Once the user endpoint device receives the agent's preferred language, it will switch the transcription language accordingly.

In another embodiment, the agent and/or the user may be capable of changing the STT transcription language during the audio communication. For example, a user-interface widget or menu item that is displayed on the WebRTC screen or the app screen may be available which allows a participant of the call to change the current transcription language if the participant determines a different language is more preferable. After a language selection is made, the user endpoint device may inform the user whether or not that language is available for STT transcription by the user endpoint device. As a call progresses, a participant of the call may determine, for example based on the subject matter of the call, that they would prefer to have a transcription in a different and/or additional language. An embodiment of the present disclosure includes such a functionality.

In a further embodiment, the user endpoint device may ask if there is a more-related language that the agent and/or user prefers for the STT.

In either of the embodiments just described, or any other embodiment consistent with the principles of the present disclosure, the user endpoint device may also determine whether it is capable of concurrently performing multiple STTs on at least a portion of the voice interaction. To determine whether or not the device can perform multiple STTs concurrently, the same performance metrics of the device may be identified as with determining whether or not the device is capable of performing a single STT, although multiple STTs will require more computational resources. In order to concurrently perform multiple STTs, the user endpoint device may be able to at least dedicate the necessary processing power and memory requirements to the separate STT tasks such that they can be performed in parallel.

If it is determined that the user endpoint device is unable to perform the desired STT, or if the device is unable to determine whether or not it has such a capability, the STT transcription may fallback to a server associated with the enterprise. Transmitting this determination to the enterprise server may notify it to instantiate an STT transcription instance for the current voice interaction at the enterprise server.

If it is determined that the user endpoint device is capable of handling the desired STT task, an instance of STT will be activated by the user endpoint device. Transmitting this determination to the enterprise server may notify it to not instantiate an STT transcription instance for the current voice interaction at the enterprise server.

Figure 5:
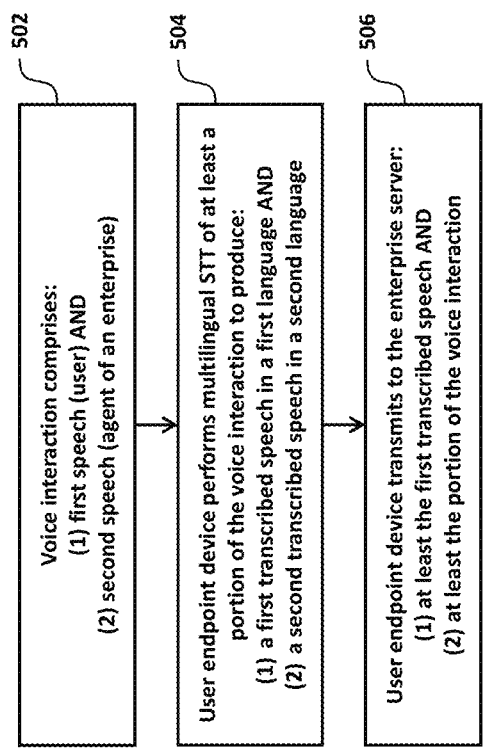
FIG. 5 depicts a flowchart of a respective example method in accordance with the principles of the present disclosure.

Steps 204 and 206 of FIG. 2 take place during the audio communication, and are further explained in the flowchart depicted in FIG. 5. As discussed above and shown in step 502, the audio communication may comprise a voice interaction between a user and an agent associated with an enterprise. The user may, via the user endpoint device, provide first speech. The agent associated with the enterprise may provide second speech. At least a portion of the voice interaction is transcribed in real-time by an STT engine to produce a first transcribed speech in a first language and a second transcribed speech in a second language at step 504. The portion of the voice interaction to be transcribed may include the first speech provided by the user, the second speech provided by the agent, or both.

The present disclosure also envisions the user endpoint device performing, concurrently, more than two STT transcriptions into more than two languages. This aspect of the invention realizes the varying interests and backgrounds of users, enterprises, operating companies that might make use of enterprises, and the agents associated with enterprises which take part in the call. Therefore, the power of the user endpoint device may be leveraged for transcribing the voice interaction into a number of different languages to address the varying interests of the involved parties.

One limiting factor on the number of STT transcriptions performed might be the number of desired languages in which the enterprise and/or the user prefer to have a transcription of the voice interaction. Another limiting factor may be the computational resources available to the STT engine. As smart devices become more powerful, and STT software becomes more advanced, the number of STT transcriptions and languages in which STT engines can concurrently transcribe may increase. Therefore, this disclosure does not present a limit on the number of STT transcriptions or languages in which the voice interaction may be transcribed. A discussion outlining embodiments of potential STT languages is presented in more detail later in the specification.

As noted above, for a voice interaction, a first STT can be performed by the user endpoint device on at least a portion of the voice interaction and a second STT can also be performed by the user endpoint device on the at least a portion of the voice interaction. More particularly, the at least a portion of the voice interaction can include first speech provided by the user and second speech provided by the agent. In a further embodiment in accordance with the principles of the present disclosure, the user endpoint device may be assisted by the agent device and/or the enterprise server with performing STT of the first speech provided by the user, the second speech provided by the agent, or both. For example, the enterprise server may perform STT of both the speech provided by the user and the speech provided by the agent. Alternatively, the agent device may be responsible for performing STT of the speech provided by the user and the speech provided by the agent. In either case, the agent device and/or the enterprise server can negotiate with the user endpoint device about which languages it has the capabilities for performing STT. Thus, with respect to embodiments in which the user endpoint device advertises and negotiates its potential STT capabilities with the agent device and/or the enterprise server, these roles can be reversed when the agent device or the enterprise server assists with the STT tasks. As such, in accordance with this embodiment, the three entities (user endpoint device, agent device, and enterprise server may all advertise and negotiate the languages for which they have STT capabilities so that a determination can be made amongst them as to a) which entity will be responsible for performing STT on what portions of the audio communication and b) in what languages such STT tasks will occur.

In a particular embodiment, some of the computing load of performing STT can be shared by the agent device which the user endpoint device can cooperate with to perform other STT. The agent device receives the second speech from the agent associated with that agent device while the user endpoint device receives the first speech from the user associated with that user endpoint device. As described herein, the user endpoint device can, for example, perform STT of the first speech in one or more different languages and transmit that STT along with at least the first speech to the enterprise server which will forward it to the agent device for display to the agent associated with that agent device. However, STT of the second speech can be performed by the agent device such that the second speech and corresponding STT transcription can be transmitted by the agent device, to the enterprise server and then on to the user endpoint device for display to the user. Thus, in accordance with this embodiment, the user endpoint device may perform STT on first speech provided by the user to be transmitted to the enterprise server, while an STT transcription of second speech provided by the agent may be performed by an agent device to which the enterprise server routes the audio communication. The enterprise server may then transmit the second transcribed speech to the user endpoint device. The user endpoint device may collaborate with the enterprise server to facilitate the exchange of the transcribed speeches as well as which languages are used for the different transcribed speeches. One of ordinary skill will also recognize that the present embodiments contemplate that the user endpoint device may perform STT on the second speech it may receive in audio format from the agent device/enterprise server. Similarly, the agent device can perform the STT of the first speech that it may receive in audio format from the user endpoint device/enterprise server.

For example, the first speech provided by the user can be transcribed by the user endpoint device into a language selected by the agent and communicated to the agent device. Alternatively, the user endpoint device may not have the capability of STT in the selected language, or one of the selected languages, and so the agent device can be responsible for performing STT of that first speech in one or more of the selected languages. In a similar manner, the agent device may not have the capability of performing STT of the second speech provided by the agent into a language selected or identified by the user. Thus, in this case, the user endpoint device may perform the STT of the second speech.

The performance of STT transcription at the enterprise server and/or on an agent device to which the enterprise server routes the audio communication may involve the enterprise server and/or agent device taking the steps outlined in the foregoing and succeeding discussion with respect to the user endpoint device. A method which facilitates STT transcription on both ends of the audio communication may be associated with a processor of the enterprise server, which may communicate with the agent device and user endpoint device to designate which device may be responsible for STT transcription, and furthermore, which portion of the voice interaction, or the audio communication, each device may be responsible for transcribing. It may be preferable for the devices to perform STT transcriptions over the corresponding portion of the voice interaction in which they are receiving from the respective call participant (i.e., the user endpoint device receives a corresponding portion of the voice interaction from the user). Such an approach may allow the devices to perform STT on portions of the voice interaction in which they are more tailored to handle. The STT engine and associated algorithmic processes at the agent device or enterprise server may become more familiar with the agent's voice in a similar way to which the user endpoint device may be better tuned, configured, and/or customized for transcription of the user's particular language and accent. Therefore, the quality of the transcription of the agent's voice may be improved, and moreover, the productivity of the call. The desired benefit of offloading of at least some of the computing load of performing STT can be accomplished as well. In other words, or to summarize, for each interaction, the user endpoint device, the contact center server (which can be a subcomponent of enterprise server) and the agent device can form a 'federated subsystem' in which they will collaborate and communicate to distribute/divide the work load among themselves to make the best use of each other's capabilities and resources for that interaction under the current circumstances each different entity is experiencing. In at least some instances, the contact center server, for example, may have the role of arbiter when more than one solution appears to be similarly effective. The term "best" can be defined differently by different enterprises. Some enterprises may prioritize accuracy over speed and maintain historical data that indicates STT of certain languages or dialects are best performed by one of entities as compared to others. Alternatively, some enterprises may prioritize speed of performing STT such that the contemplated federated subsystem will determine how to distribute tasks so that they are able to be performed as quickly as possible. In some instances, the "best use" of resources can vary throughout the day such that as the workload on the contact center server, for example, varies, then more tasks are offloaded to be performed by the user endpoint device or the agent device.

An embodiment of the present disclosure comprises a determination of the STT capability of the user endpoint device as a quantitative metric that can be used in determining how many STTs may be performed. A further embodiment comprises assigning weights to different languages based on the computational resources required for a transcription to or from each language. The number of STTs may be a function of the languages associated with the audio communication and desired transcription languages. A set of weights may be developed for potential pairs of spoken language-transcribed text combinations. For example, a conversation between a user and an agent may be taking place in English, and the desired transcription languages may be Hindi, French, and Chinese. It may be determined that the user endpoint device has an overall STT capability of "20", and that the English-Hindi, English-French, and English-Chinese transcriptions have weights of 4, 6, and 9, respectively. Therefore, in this example, the user endpoint device would be considered capable of performing the desired STT transcriptions because the STT transcription weights add up to 19, which is below the STT capability limit of 20.

The above embodiment may be accomplished through the use of a data look-up table containing a list of potential STT spoken language-transcribed text pairs and a weight for each corresponding to the computational difficulty of the respective transcriptions. This embodiment may comprise the application or webpage referencing the data look-up table to determine the weights associated with the identified languages. The application or webpage may then sum the weights and compare the sum to the STT capability of the device.

In a further embodiment, the STT languages may be selected by the user endpoint device so as to utilize as much of the STT capability as possible based of the identified languages. Thus, referring back to the above example, if the user endpoint device had an STT capability of 15, the user endpoint device may proceed with the English-Chinese and English-French transcriptions. Alternatively, the user endpoint device may take further steps to determine a subset of transcriptions from those initially identified.

In another embodiment of the present disclosure, the user endpoint device may receive from the enterprise server an identification of STT languages weighted by their priority. In this instance, the user endpoint device may prioritize this STT language selection based on the priority specified by the enterprise server rather than a maximizing of the computational resources available for STT transcription.

Once at least a portion of the voice interaction has been transcribed by the STT engine associated with the user endpoint device, the user endpoint device transmits to the enterprise server: (1) at least the first transcribed speech and (2) at least the corresponding portion of the voice interaction. In an embodiment of the present disclosure, the voice interaction is transmitted in full while the STT transcription and transmitted transcribed speech may comprise a portion of the voice interaction. For example, the user endpoint device may perform STT of the user's voice, and send the transcribed speech along with the audio of the full voice interaction to the enterprise server.

Through the use of SIP, VoIP, WebRTC, or similar communication technology capable of transmitting data via multiple channels, the first and second speech may be converted into a digital signal and transcribed through the use of an STT engine available to the processor associated with the user endpoint device. Further, these communication means may be utilized to transmit the voice portion of the interaction after it has been converted into a digital signal. The transcribed speech may be transmitted through a separate digital channel established between the user endpoint device application or web app and the enterprise server.

Figure 6:
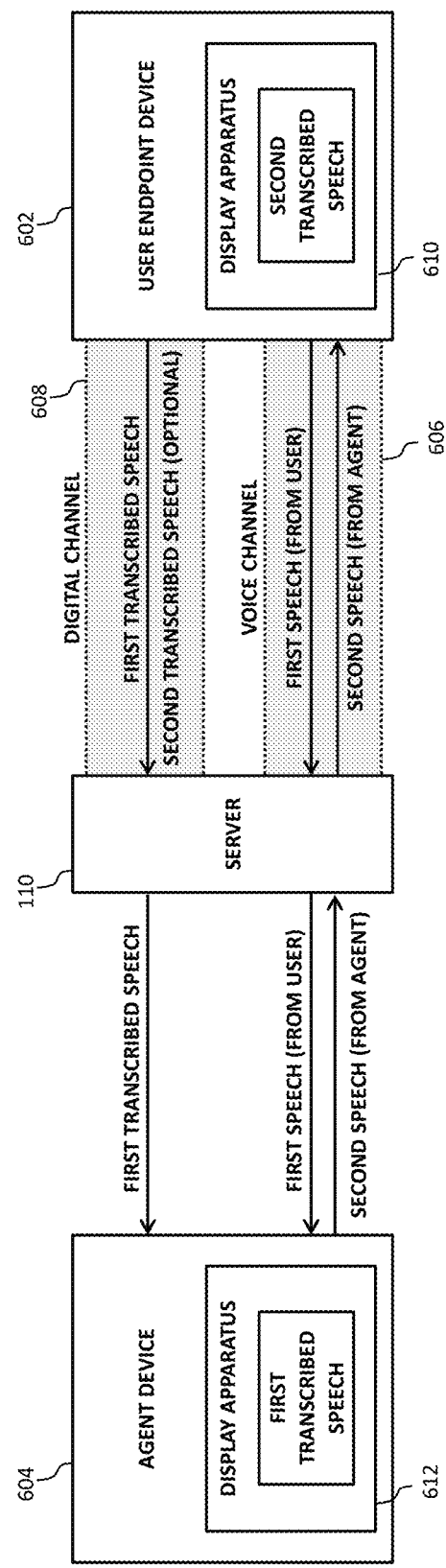
FIG. 6 provides a schematic overview of an embodiment of multi-channel communication in accordance with the principles of the present disclosure.

The WebRTC and VoIP technologies discussed above permit multi-channel communication between call participants. Accordingly, the system and method disclosed herein may make use of a voice channel, to exchange the speech produced by each participant, and a digital channel, to transmit the STT transcriptions from the user endpoint device to the enterprise server. The voice channel may still be a "digital channel" based on the manner in which the voice data is formatted and transmitted on that channel. However, for clarity, the content of the voice channel is audio or voice data and, therefore, can be referred to simply as the "voice channel" as an easy way to distinguish the voice channel from other digital channels. The illustration provided in FIG. 6 provides a schematic overview of an embodiment of the present disclosure. The audio of the voice interaction, comprising first speech provided by the user through the user endpoint device 602, and second speech provided by the agent through a device associated with the agent 604, may be transmitted between the user and the agent via a voice channel 606 established when the audio communication is initialized. Transcribed speech may be transmitted via a digital channel 608 established when the audio communication is initialized. FIG. 6 illustrates an embodiment of the present disclosure wherein at least a first transcribed speech is transmitted to the enterprise server 110 using the established digital channel 608 and the first and second speech are transmitted via the established voice channel 606. Further, via the established voice channel 606, the enterprise server 110 may receive the first speech provided by the user, and then route the first speech to the device associated with the agent 604. The enterprise server 110 may receive the second speech provided by the agent and route it to the user endpoint device 602 via the established voice channel 606.

The second transcribed speech may be presented on a display apparatus associated with the user endpoint device 610 in a second language that may have been preconfigured as a related language of the user. The related language of the user may be a preferred language such as the user's mother tongue, i.e., the user's native language, or alternatively a language with which the user feels more acquainted for the particular subject matter of the conversation.

The first transcribed speech may be presented on a display apparatus associated with the agent's device 612, and may be in a first language which is a related language of the agent. The related language of the agent may be a preferred language such as the agent's mother tongue, i.e., the agent's native language, or alternatively a language that the agent feels comfortable with for the particular subject matter of the conversation. For example, the agent may be able to converse with an English-speaking user in English but be more acquainted with a different language and thus prefer a transcription of the user's voice in the language with which he or she feels more acquainted. Alternatively, the agent may simply be more acquainted with a different accent than that of the user, and thus may prefer a transcription of the speech into text in the language in which the user is speaking, but without the accent.

An example wherein the above described embodiment would be particularly useful is during times when the load on a contact center suddenly increases and agents are employed on a temporary basis and/or swapped between different agent groups based on the requirements of the call center. In this situation, which is commonly encountered during festival and holiday times of the year such as Christmas, there is a high probability of a Hindi agent being assigned to a call in English, or vice versa.

The present disclosure also addresses the desire for an enterprise to have a transcription of the voice interaction in its own related language. For example, the enterprise may be a contact center located in the United States, providing service for an operating company based in France, and employing a Hindi speaking agent. In this example, the call center may prefer to have a transcript of the language in English for its records.

The present disclosure also addresses the desire for an operating company on behalf of an enterprise, e.g., a contact center, to have a transcription of the voice interaction transcribed in its own related language. Referring back to the above example, the French company may prefer to have a transcription of the voice interaction in French. Therefore, in this example, the STT engine associated with the user endpoint device may transcribe the voice interaction into at least an English transcription, a French transcription, and possibly, for the agent, a Hindi transcription. With user devices becoming more powerful, it may be possible to transcribe voice interactions into multiple languages locally on the user endpoint device.

Finally, and significantly, the present disclosure also addresses the need for enterprises and operating companies to have a transcription of the voice interaction in a default system language for the purposes of backend analytics and processing. Once the transcription in a default system language is transmitted to the enterprise server, it may be archived, recorded, and analyzed for further processing.

Standard internal circuits such as network of user endpoint devices are able to receive and transmit data through the use of network and Bluetooth components The exemplary embodiments of this present disclosure have been described in relation to a contact center. However, to avoid unnecessarily obscuring the present disclosure, the preceding description omits a number of known structures and devices. This omission is not to be construed as a limitation of the scope of the present disclosure. Specific details are set forth by use of the embodiments to provide an understanding of the present disclosure. It should however be appreciated that the present disclosure may be practiced in a variety of ways beyond the specific embodiments set forth herein.

Furthermore, while the exemplary embodiments of the present disclosure illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, changes, additions, and omissions to this sequence can occur without materially affecting the operation of embodiments of the present disclosure.

A number of variations and modifications of the present disclosure can be used. It would be possible to provide for some features of the present disclosure without providing others.

For example in one alternative embodiment of the present disclosure, the systems and methods of this present disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present disclosure, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present disclosure is dependent on the speed and/or efficiency requirements of the system, the particular function, and the particular software or hardware systems or microprocessor or microcomputer systems being utilized.

In yet another embodiment of the present disclosure, the disclosed methods may be partially implemented in software that can be stored on a storage medium, executed on programmed general-purpose computer with the cooperation of a controller and memory, a special purpose computer, a microprocessor, or the like. In these instances, the systems and methods of this present disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, it is not limited to such standards and protocols. Other similar standards and protocols not mentioned herein are in existence and considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

While much of the foregoing discussion relates to implementations on a server associated with an enterprise, it is to be appreciated that the user endpoint device would be capable of performing in the same manner. Standard networking circuits available on common user endpoint devices may be utilized for the receiving and transmission of data.

The foregoing discussion has been presented for purposes of illustration and description. It is not intended to limit the present invention to the form or forms disclosed herein. In the foregoing Detailed Description, for example, various features are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present disclosure.

Moreover, though the disclosure herein has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Having thus described the present application in detail and by reference to embodiments and drawings thereof, it will be apparent that modifications and variations are possible without departing from the scope defined in the appended claims.

What is claimed is:

1. A processor-based method for providing speech-to-text (STT) transcription, comprising:
    initiating, by a user endpoint device, an audio communication between an enterprise server and the user endpoint device, the audio communication comprising a voice interaction between a user associated with the user endpoint device and an agent associated with an agent device to which the enterprise server routes the audio communication;
    determining, by the user endpoint device, whether the user endpoint device has the computational capability to perform STT of at least a portion of the voice interaction;
    transmitting, by the user endpoint device to the enterprise server, the determination as to whether the user endpoint device has the computational capability to perform STT of the at least the portion of the voice interaction;
    performing, by the user endpoint device during the audio communication, a first STT of the at least the portion of the voice interaction to produce a first transcribed speech in a first language;
    concurrent with performing the first STT, performing, by the user endpoint device, a second STT of the at least the portion of the voice interaction to produce a second transcribed speech in a second language different than the first language, and
    transmitting, by the user endpoint device during the audio communication, the at least the portion of the voice interaction and at least the first transcribed speech from the user endpoint device to the enterprise server.

2. The method of claim 1, further comprising:
    transmitting, by the user endpoint device during the audio communication, the second transcribed speech from the user endpoint device to the enterprise server.

3. The method of claim 1, wherein the at least the portion of the voice interaction comprises first speech provided by the user and second speech provided by the agent.

4. The method of claim 3, wherein the second transcribed speech comprises a transcription of the second speech provided by the agent, and further comprising:
    displaying, by the user endpoint device, the transcription of the second speech provided by the agent on a display apparatus of the user endpoint device during the audio communication.

5. The method of claim 1, wherein the at least the portion of the voice interaction and the first transcribed speech are transmitted substantially concurrently with each other, wherein the first transcribed speech is transmitted via a digital channel and the at least the portion of the voice interaction is transmitted via a voice channel.

6. The method of claim 1, wherein the first language is a default system language defined by the enterprise server.

7. The method of claim 1, wherein:
    the first language is a related language of the agent, and
    the second language is a related language of a user.

8. The method of claim 7, further comprising:
    sending, by the user endpoint device, an inquiry to the enterprise server requesting an identification of a more-related language of the agent; and
    in response to sending the inquiry, receiving, by the user endpoint device from the enterprise server, the identification of the more-related language of the agent.

9. The method of claim 1, wherein:
    initiating the audio communication, performing the first STT, and transmitting the at least the portion of the voice interaction and the first transcribed speech are performed by one of
    an audio-capable application executing on the user endpoint device,
    a plug-in of a web browser executing on the user endpoint device, or
    a customized client application executing on the user endpoint device.

10. A user endpoint device for providing speech-to-text (STT) transcription, comprising:
    a memory device storing executable instructions; and
    a processor in communication with the memory device, wherein the processor when executing the executable instructions:
        initiates an audio communication between an enterprise server and the user endpoint device, the audio communication comprising a voice interaction between a user associated with the user endpoint device and an agent associated with an agent device to which the enterprise server routes the audio communication;
        determines whether the user endpoint device has the computational capability to perform STT of at least a portion of the voice interaction;
        transmits to the enterprise server, the determination as to whether or not the user endpoint device has the computational capability to perform STT of the at least the portion of the voice interaction;
performs during the audio communication, a first STT of the at least the portion of the voice interaction to produce a first transcribed speech in a first language;
concurrent with performing the first STT, performs a second STT of the at least the portion of the voice interaction to produce a second transcribed speech in a second language different than the first language, and
transmits, during the audio communication, the at least the portion of the voice interaction and at least the first transcribed speech from the user endpoint device to the enterprise server.

11. The system of claim 10, wherein the processor when executing the executable instructions:
transmits, during the audio communication, the second transcribed speech from the user endpoint device to the enterprise server.

12. The system of claim 10, wherein the at least portion of the voice interaction comprises first speech provided by the user and second speech provided by the agent.

13. The system of claim 12, wherein the second transcribed speech comprises a transcription of the second speech provided by the agent, and wherein the processor when executing the executable instructions:
displays the transcription of the second speech provided by the agent on a display apparatus of the user endpoint device during the audio communication.

14. The system of claim 10, wherein the at least portion of the voice interaction and the first transcribed speech are transmitted substantially concurrently with each other, wherein the first transcribed speech is transmitted via a digital channel and the at least the portion of the voice interaction is transmitted via a voice channel.

15. The system of claim 10, wherein the first language is a default system language defined by the enterprise server.

16. The system of claim 10, wherein:
the first language is a related language of the agent, and
the second language is a related language of a user.

17. The system of claim 16, wherein the processor when executing the executable instructions:
sends an inquiry to the enterprise server requesting an identification of a more-related language of the agent; and
in response to sending the inquiry, receives from the enterprise server, the identification of the more-related language of the agent.

18. The system of claim 10, wherein:
initiating the audio communication, performing the first STT, and transmitting the at least the portion of the voice interaction and the first transcribed speech are performed by one of
an audio-capable application executing on the user endpoint device,
a plug-in of a web browser executing on the user endpoint device, or
a customized client application executing on the user endpoint device.

* * * * *